United States Patent [19]

Barber

[11] 4,439,561

[45] Mar. 27, 1984

[54] SEALANT COMPOSITION AND METHOD

[75] Inventor: Alan G. Barber, Woodbury, Conn.

[73] Assignee: Union Carbide Corporation, Danbury, Conn.

[21] Appl. No.: 361,546

[22] Filed: Mar. 24, 1982

[51] Int. Cl.$^3$ .................. C08L 99/00; C09K 3/12
[52] U.S. Cl. .................................. 524/13; 524/47; 524/52; 523/130; 523/177; 525/935; 106/33; 252/72
[58] Field of Search .............. 523/130, 177; 524/13, 524/47, 52; 525/906, 935; 106/33; 252/72; 528/208

[56] References Cited

U.S. PATENT DOCUMENTS

| | | | |
|---|---|---|---|
| 2,357,650 | 9/1944 | Hall et al. | 106/33 |
| 3,063,966 | 11/1962 | Kwolek et al. | 260/78 |
| 3,097,991 | 7/1963 | Miller et al. | 162/157 |
| 3,560,318 | 2/1971 | Miller et al. | 161/82 |
| 3,630,914 | 12/1971 | Nankee et al. | 106/33 |
| 3,767,756 | 10/1973 | Blades | 264/184 |
| 3,869,429 | 3/1979 | Blades | 260/78 S |
| 3,881,943 | 5/1975 | Fuller et al. | 106/33 |

FOREIGN PATENT DOCUMENTS 767168  1/1957  United Kingdom ................ 106/33

OTHER PUBLICATIONS

A Laboratory Handbook of Pulp and Paper Manufacture, Julino Grant, 2nd Edition, 1961, Great Britain.
Kevler (trademark) aramid Pulp for Paper Making, Dr. E. A. Merriman, E. I. Du Pont de Nemours Co., copyright 1981, TAPPI, reprinted from 1981 TAPPI Non-Woven Fibers and Binders Seminar Notes.

Primary Examiner—John Kight, III
Assistant Examiner—Nathan M. Nutter
Attorney, Agent, or Firm—James L. Sonntag

[57] ABSTRACT

Disclosed is a composition for stopping leaks which comprises the combination of a fibrillated fiber and a particulate material, such as a seed meal, in a suspension in a liquid medium. A preferred fibrillated fiber comprises the polymer, poly(imino-1,4-phenyleneiminoterephthaloyl).

42 Claims, No Drawings

SEALANT COMPOSITION AND METHOD

The present invention relates to a sealant composition for plugging leaks in leaky containers. Particularly, the invention relates to a composition comprising a fibrillated fiber and a particulate material such as a seed meal. The composition of the invention is particularly useful for plugging leaks in heat exchange systems such as automobile cooling systems and the like.

So called "stop leak" compositions have long been used for stopping leaks in automobile cooling systems. Many of these compositions are aqueous suspensions of a particulate material that is entrained in the leak, thereby plugging it. Particulate materials used include linseed meal and metal flakes. However these compositions are often not effective in completely stopping the leak, particularly under pressure, resulting in excessive loss of the coolant.

For many years stop leak compositions were improved by the addition of an asbestos fiber to the particulate material. The fibers would in effect fill the voids between the particles plugging the leak, thereby hindering seepage of the leak. However, this was also not always effective and there are now known to be health and environmental problems associated with the use of asbestos. Therefore an improved stop leak composition that is environmentally safe and is more effective in stopping leaks than those heretofore known would be highly desirable.

It has now been found that fibrillated fibers, as defined below, and a particulate material, preferably a seed meal, in combination operate in a synergistic manner to stop leaks more effectively than stop leak compositions of the prior art. The stop leak compositions of the invention are particularly effective under the pressure and temperature conditions found in automobile cooling systems.

The invention in one of its aspects comprises a composition for stopping of at least one leak in a leaky container which comprises a suspension in a liquid medium of:

(a) particulate material of a size and in an amount sufficient to become entrained in the leak, and (b) fibrillated fiber coacting with the particulate material to seal the leak by an entwining action.

In another aspect, the invention comprises a composition for the stopping of at least one leak in a leaky container which comprises a suspension in a liquid medium of:

(a) a fibrillated fiber having a length of about 1 mm to about 7 mm and a surface area greater than about 1 $m^2/g$, and (b) a particulate material of a size and in an amount sufficient to become entrained in the leak.

Preferably the surface area of the fiber is about 10 $m^2/g$.

In another aspect, the invention comprises a method for the plugging of at least one leak in a leaky container which comprises placing in the leaky container a suspension in a liquid medium of particulate material in an amount sufficient to become entrained in the leak and a fibrillated fiber coacting with the particulate material to seal the leak by an entwining action.

In another aspect, the invention comprises a method for the plugging of at least one leak in a leaky container which comprises:

(a) forming a suspension in a liquid medium by dispersing in the liquid medium an effective amount of a fibrillated fiber having a length of about 1 mm to about 7 mm and a surface area greater that about 1 $m^2/g$, and a particulate material in an amount and a size sufficient to become entrained in the leak.

(b) placing the suspension in the leaky container.

Without being bound to any theory, it is believed that the fibrillated fibers used in the invention provide a bonding of the particulate material as it becomes entrained and begins to form a plug in the leak. As a plug is formed by the particulate material being retained in the leak, the fibrillated fibers interact with these particles by entwining around the particles and providing a bonding together of the particles. Through this interaction a more effective and stronger seal is formed. This differs from prior art compositions that do not contain fibrillated fibers as herein defined, for example asbestos, wherein the fibers do not entwine and bond the particles of the particulate matter. In these prior art compositions the fibers "mats" against the particles in the leak and do not bond or interact with the particles in a synergistic manner, as the fibrillated fibers and particles of the invention. The fibers used in the prior art essentially provide a mere plugging action of the small leaks between the particles. However in the present invention, the fibrillated fibers not only provide this additional leak plugging but also interact with the particles in a synergistic manner to bond the particles together. This interaction of the particles and the fibrillated fiber is suprising since there is no teaching or recognition in the prior art that fibrillated fibers would co-act with particles differently than any other fiber when used in a stop leak composition. The effect of the synergistic interaction resulting from the bonding is a more effective plug that can withstand higher pressures and can plug larger leaks than was generally possible with prior art compositions.

A suitable liquid medium for use in the invention includes any liquid medium in which the fibrillated fiber and particulate matter can be dispersed in effective amounts. Typically the liquid medium comprises water. Also contemplated as liquid media are those containing so called "antifreeze" compositions used in automobile coolant systems. Typically these contain a monohydric or polyhydric alcohol such as methanol or ethylene glycol.

By fibrillated fiber is meant a fiber that is frayed or split along its length or a fiber wherein the ends are split and splayed out, resulting in a multitude of very fine fibrils upon a core fiber. The smaller and thinner fibers or fibrils formed on the core fiber by the fraying or splitting are known as fibrillae. The fibrillated fibers of the invention can be formed from fibers that are axially oriented and are less strongly bonded in the transverse direction, such as wood, and certain synthetic fibers described below.

A commonly known fiber that can be fibrillated is wood fiber, which can be fibrillated by controlling the cutting conditions of the fiber. The fibrillating of wood fiber is explained by Julino Grant in Laboratory Handbook of Pulp and Paper Manufacture, 2nd Edition, 1961, Great Britain, at pp. 147–152, which is hereby incorporated by reference.

Fibrillated fibers made from synthetic materials are also contemplated for used in the invention. Examples of synthetic fibrillated fibers and methods for making them are disclosed in U.S. Pat. No. 3,097,991, issued to W. A. Miller et al. on July 16, 1963 and U.S. Pat. No. 3,560,318, issued to W. A. Miller, et al. on Feb. 2, 1971.

These patents are hereby incorporated by reference. Processes for making synthetic fibrillated fibers typically involve the cutting and beating of a fiber or a film of an oriented polymer, in for example a paper beater. Synthetic polymers can be formed into oriented films or fibers by methods known in the art. These typically involve the controlling of the extrusion process and/or a stretching process to orient the polymer in the film or fiber. The oriented fibers or films must be stronger in an axial direction and weaker in a transverse direction to an extent to allow fibrillation. Optionally the polymer can be coextruded with an incompatible polymer, as is described in the above cited patents, to more readily form a fiber or film that is strong in an axial direction and weak in a transverse direction. This can be accomplished by addition of the incompatible polymer to the polymer melt or the polymer solution or "dope" that is to be extruded. Some polymers such as poly (imino-1,4-phenyleneiminoterephthaloyl), described below, may be formed in a highly oriented state with long, strong, axial, crystalline "grains" separated by weaker amorphous regions, and may not require the use of an incompatible polymer to form fibrillatable fibers. The formation of fibrillated fibers from synthetic polymers is well known in the art.

The fibrillated fibers used in the invention should be fibrillated to the extent to provide the synergistic coaction of the invention. This includes fibrillated fibers having a surface area greater than about 1 m²/g. Preferably the surface area is about 10 m²/g. The surface area of the fiber is measured by the B-E-T method as described by Brunauer, et al. in J. Am. Chem. Soc., 60, 309 (1938).

The length of the fibrillated fiber should be great enough to provide the entwining coaction with the particles used in the invention. This includes fiber having an average length greater than or equal to 1 mm. The fibrillated fiber should not be too long to interfere or hinder the fluid flow within leaky containers such as within automobile cooling systems where such fluid flow is desirable. In the typical practice of the invention, the average length of the fibrillated fiber is about 1 mm to about 7 mm.

The fibrillated fibers of the invention must be of a substance that is stable. By stable is meant a substance that doesn't significantly react or degrade in the environmental conditions in which the composition of the invention is used. For use in automobile cooling systems and the like, this would be a substance that is thermally stable up to about 300° F., preferably up to about 500° F., and is unreactive with the components of the coolant, such as water, corrosion inhibitors, anti-freeze compositions and other substances commonly found in automobile cooling systems.

Any polymer that can be made into a fibrillated fiber is suitable for use in the fibrillated fibers of the invention. Suitable polymers include the polyamides and the polysulfones.

The preferred fiber for use in the invention is a fiber comprising a polymer consisting essentially of the recurring units selected from the group;

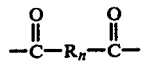 (I)

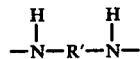 (II)

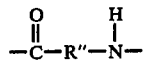 (III)

with the proviso that

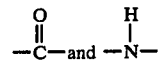

are present in the polymer in substantially equimolar amounts, and wherein R, R' and R", which may the same or different, are divalent radicals, n may be zero or the integer one, and wherein the R, R', and R" radicals in the polymer are saturated or unsaturated aliphatic or ringed aliphatic radicals contaning 1 to 10 carbon atoms, or single ringed or fused multiringed carbocylic on heterocylic aromatic radicals. The R, R', or R" may contain substituents and other radicals that do not unduly interfere with the ability to form fibrillatable fibers, for example through cross-linking, or cause the fiber to become too unstable or too chemically reactive for practice of the invention. The preferred polymers of the class, described above for use in the fibrillated fibers of the invention are those where the R, R', and R" in the polymer are single rigid radicals with extended bonds or a series of such rigid radicals which are linked together directly by extended bonds. Thus, the essential portion of the polymer consists of polyamide units (including polyoxamide units when n is zero), which provide stiff chains.

By the expression "rigid radicals" is meant (a) the ring radicals: single ring or fused multi-ring aromatic carbocylic or heterocyclic radicals, trans-1,4-cyclohexylene

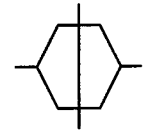

and 1,4(2,2,2)-bicyclo-octylene and (b) the linear unsaturated radicals: vinylene

and acetylene—C≡C—. It will be understood that monomers containing amino groups directly attached to linear unsaturated radicals are not stable and hence vinylene or acetylene cannot serve as R' or that portion of a R" radical attached to

By the expression "extended bonds" is meant chain-extending bonds of the radical (as determined by the true bond angles) which are essentially coaxial or parallel and oppositely directed, such as in p-phenylene and 1,5-naphthylene.

A more preferred class of polymers of the group described above are those polyamides (n being the integer one) wherein at least 50 mole percent of the total of R, R', and R" radicals are wholly aromatic. A more preferred class of these polymers are those polyamides wherein R, and R' are selected from the group 1,4-phenylene, 4,4'-biphenylene, 2,6-naphthylene, 2,5-pyridene, trans-vinylene and trans-1,4-cyclohexylene and R" is 1,4-phenylene with the proviso that at least 50 mole percent of either R or R' radicals are 1,4-phenylene.

The structure and methods for making these polymers and methods for making fibers therefrom are described in U.S. Pat. No. 3,767,756 issued Oct. 23, 1973 to Blades, U.S. Pat. No. 3,063,966 issued Nov. 13, 1962 to Kwolek et al. and U.S. Pat. No. 3,869,429 issued Mar. 4, 1975 to Blades. These patents are hereby incorporated by reference.

The most preferred fiber consists essentially of poly(imino-1,4-phenyleneiminoterephthaloyl) which is a polyamide polymer characterized by the repeating unit,

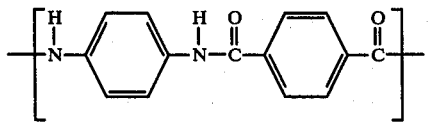

This polymer is available commercially as Kevlar (trademark) from E. I. duPont de Nemours & Co., Centre Road Building, Wilmington, Del., in a "pulp" form. This "pulp" consists essentially of short fribrillated fibers or fibers with a multitude of fribrillae or very fine fibrils upon a core fiber. Kevlar (trademark) pulp is described by Merriman in "Kevlar (trademark) Arimid Pulp for Paper Making", reprinted from 1981 TAPPI Non-Woven Fibers and Binders Seminar Notes, TAPPI, 1981, which is hereby incorporated by reference. The method for forming fibrillated fibers of this polymer is not disclosed, but these fibrillated fibers are probably formed in a manner similar to the well known methods, discussed above, for forming fibrillated fibers from synthetic materials. These fibers are most preferred in the composition of the invention because of their fibrillations, high thermal stability and inertness to chemical and biological action.

As used herein, the term "particulate material" means any material comprising particles that when used in the composition and method of the invention become entrained in the leak. Particulate materials useful in the invention include any particulate material wherein the particles thereof retain their physical integrity in the environment in which it is used. Preferably the particulate material has a density near that of the liquid medium in which it is suspended. Without being bound to any theory, it is believed that the most effective particulate materials are those that are swellable under cooling system conditions to form a plug in the leakage opening that is more firm and resists pressure better than would be the case if swellable particulate material was not used. By "swellable" particulate material is meant those organic materials that absorb water to form a soft exterior but retain their physical integrity. These include hard organic particulate materials that when placed in water will form a particle with a soft exterior but retain a hard interior. Examples include seed meals, ground roots, cellulosic materials such as wood and the like.

The preferred particulate material is seed meal. The seed meal for use in the invention includes the meals from which the oil has been extracted and are usually byproducts of processes for extracting seed oil, such as solvent extraction and presses. The meal of any seed should be suitable. Suitable seed meals include linseed meal, jojoba bean meal, and soybean meal. The preferred seed meal is soybean meal.

The composition of the invention is made by dispersing the fibrillated fiber and the particulate material in a liquid medium. This may be accomplished by any suitable method. An additive, such as a dispersant, may be necessary to disperse the fibrillated fiber. The choice of a dispersant is not critical and can include surfactants common in the art or those substances that have the same properties. Suitable surfactants include the quaternary ammonium compositions used as surfactants, such as quaternary ammonium chloride. The fiber may also be dispersed without use of a dispersant by adding a dry fiber to a liquid medium and using a mechanical blender to disperse the fiber.

It is preferable that a suspending agent be used to prevent settling of the seed meal. Suitable suspending agents include various alumino-silicate clays that are known in the art as suspending agents, such as the bentonite-type clays. Suitable clays for suspending agents include Bentonite GPG-30 and HPM-20 manufactured by American Colloid Co., Skokie, Ill., and available from Whittaker, Clark & Daniels, Inc., 1000 Coolidge Street, South Plainfield, N.J. A preferred clay is a bentonite clay such as Bentonite GPG-30. The suspending agent may also aid in the dispersion of the fiber, rendering unnecessary the use of a surfactant.

A thickener may additionally be used to hinder settling of the components, particularly the particulate material. Other additives may be desirable such as buffering agents. Addition of a preservative to prevent biological degradation and fermentation of the seed meal is preferred. It may also be desirable to add a "dryer". A dryer is generally an alumino-silicate clay that has the function of drying a very slow or seeping leak.

Other optional additives may be employed. These include, for example, known corrosion inhibiters used to protect surfaces of aluminum, iron and other metals or materials that may be used as a material of construction of the leaky container or other surface that may contact the liquid medium. The corrosion inhibitors include silicone-stabilized silicone/silicate copolymer corrosion inhibitors, molybdates, alkanolamine salts of silicates, borates, phosphates, benzoates, hydroxyl benzoates or acids thereof, silicones, alkali metal nitrates alkali metal nitrites, tolyltriazole, alkali metal or alkanolamine salts of silicates, mercaptobenzothiazole and the like, or mixtures thereof. If one or more of the known inhibitors are employed, the sum total of all inhibitors should be used in an "inhibitory effective amount", i.e., an amoumt sufficient to provide some corrosion inhibition with respect to the surfaces to be protected. Other typical optional additives would include wetting agents and surfactants such as, for example, known ionic and non-ionic surfactants such as the poly (oxyalklene) adducts of fatty alcohols; antifoams and/or lubricants such as the well-known polysiloxanes and the polyoxyalkylene glycols, as well as any other minor ingredients known in the art that do not adversely affect the corrosion resistance sought to be achieved. In a preferred method of the invention, the fibrillated fiber and the particulate matter is dispersed in a liquid medium to form a suspension which is a composition of the invention. The suspension is then added to the leaky container, preferably an automobile cooling system, containing a liquid coolant. The suspension is then diluted and dispersed in the container to form a second suspension, also a composition of the invention. In an automobile cooling system the dispersion is provided automatically by the flow of the coolant in the system as it operates. The second suspension then provides effective amounts of fibrillated fiber and particulate matter to seal leaks.

The composition of the invention contains sufficient fibrillated fiber and particulate matter to provide a synergistic leak stopping ability. The effective amounts of the fibrillated fiber and particulate matter vary widely and depend upon the nature and size of the leak, the environmental conditions of the leaky container and the particular fibrillated fiber and particulate material used. The effective amount of the particulate material is that amount required for particles to become entrained in the leak as the fluid flows therethrough. The effective amount of fibrillated fiber is that amount necessary to interact in the above described manner with the particulate material that is entrained in the leak. It has been found that as long as some particulate material becomes entrained in the leak only a very small amount of fibrillated fiber is necessary to interact with the particulate material to provide the synergistic results of the invention. In tests of compositions of the invention similar to those recited in the examples below, it was found that a significant proportion of the fibrillated fiber remained free in suspension after leaks were completely sealed. This would indicate that there was an excess of fiber in these compositions and that the minimum effective amount of fibrillated fiber would be significantly less than that found in these compositions. Generally contemplated in the invention for commercial and practical reasons relating, for example to ease of formulation, are compositions containing fibrillated fiber and particulate material at a weight ratio of about 1:20 to about 20:1, preferably about 1:5 to about 1:15, most preferably about 1:10 of fibrillated fiber to particulate matter. However, as indicated above, a smaller proportion of fibrillated fiber is probably effective in stopping leaks.

The size of the leak the composition of the invention will effectively seal is dependent upon the size of the particles of the particulate material and the type of particulate material used. Generally the size of the particles in the particulate material should be such that under the environmental conditions of the leaky container, particles become entrained in the leak. Particles approximately near the size of the leak and larger are generally suitable, although it should be considered that in the environment found in the leaky container, such as the higher pressures and temperatures found in automobile cooling systems, the particles may swell or otherwise change in volume. Generally it is desirable to avoid a large proportion of very fine particles (under about 35 mesh in a dry condition) in the particulate material. For use in automobile cooling systems the particulate material is preferably soybean meal between about 35 mesh and about 24 mesh (Tyler). To seal a crevice leak of about 0.018 inches or less, a soybean meal that passes through a 20 mesh (Tyler) screen when dry was found suitable in plugging leaks under conditions typifying an automobile cooling system (about 170° F. to about 250° F. and up to about 15 psig). A composition of the invention containing soybean meal screened through a 20 mesh (Tyler) screen when dry was found to seal crevice leaks as large as 0.020 inches under similar conditions.

The following examples illustrate the invention and compare it with prior art compositions. They are not intended to limit the invention in any way.

EXAMPLE 1

A stop leak composition of the invention is made by dispersing in tap water a fibrillated fiber and soybean meal. To disperse the fibrillated fiber and suspend the soybean meal an alumino-silicate clay (Bentonite GPG-30 from American Colloid Co., Skokie, Ill.) is used. Borax is used as a buffer. Additionally a preservative (UCARCIDE (trademark) available from Union Carbide Corporation, Old Ridgebury Road, Danbury, Conn.), a seeping leak dryer (Attaclay available from A. E. Fleming, 13315 Stephen Road, Warren, Mich.) and a thickener (ASE-60 available from Rohm & Haas, Independence Mall West, Philadelphia, Pa.) are added.

The fibrillated fiber is Kevlar (trademark) 29 Aramid Pulp and is generally described above as the most preferred fiber. The pulp is designated Merge 6F218, has fiber lengths in the range of about 1 mm to about 4 mm with a nominal average length of about 2 mm and has a surface area of about 10 $m^2/g$.

The soybean meal is obtained from Cargill, Incorporated, 2400 Industrial Drive, Sidney Ohio, and has the analysis, in weight percent of the meal, as shown in Table I. The soybean meal is ground and screened while dry through a 24 mesh (Tyler) screen.

TABLE I

| Crude Protein | $\geq 44\%$ |
| --- | --- |
| Crude Fat | $\geq 0.50\%$ |
| Crude Fiber | $\leq 7.0\%$ |
| Ash | $\leq 7.0\%$ |
| Moisture | $\leq 12.0\%$ |

The amounts of the components are not critical, however, for a commercial formulation of a stop leak composition of the invention, suitable amounts of the components in weight percent based on the total weight of the composition are as follows; about 4 to about 7, preferably about 5 to 7 percent of the suspending agent; about 0.5 percent of the borax; about 0.6 to about 1 percent of the preservative; about 1 to about 5, preferably about 1 to about 3 percent of the soybean meal; about 0.1 to about 0.5, preferably about 0.1 to about 0.3 percent of the fibrillated fiber; about 1 percent of the dryer; and about 0.5 to about 0.8 percent of the thickener; with water constituting the remainder of the composition. The above recited ranges are for a composition that is to be used in an automobile cooling system and is to be added to and diluted by the coolant liquid according to the preferred method of the invention recited above. The dilution ratio contemplated for the composition of this example is about 3.2 parts composition to about 100 parts of the combined stop leak composition and coolant. This corresponds to the addition of about a 16 fluid ounce can of stop leak composition to a 16 quart ounce can of stop leak composition to a 16 quart cooling system.

EXAMPLE 2

Compositions made according to the invention, containing a particulate material and a fibrillated fiber, were tested. For comparison, compositions using a nonfibrillated fiber (asbestos fiber) and a seed meal were also made and tested.

A bench test unit was used to measure the effectiveness of the compositions tested. The bench test unit was made to simulate pressure and temperature conditions typically found in an automobile cooling system. It comprised a vertical closed cylindrical reservoir 3⅞ inches in diameter and 5½ inches high fitted with a flanged leakage adaptor 1½ inches from the reservoir bottom, and a pressure fitting above the fluid line in the reservoir. The pressure fitting was attached to a pressure regulated compressed air source such that any desired pressure in the reservoir could be achieved. The reservoir was also fitted with a thermoregulator (Fenwal-Thermoswitch, size No. 17100 115 V, Scientific Glass and Apparatus Co.); and a heater (Chromaloy Rl-250 115 V, 250 W). Attached to the reservoir was an inlet and outlet for circulating liquid using an external pump. The inlet was a ⅜ inch brass tube and was located about 1½ inches from the reservoir bottom. This tube was curved at a 45 degree angle to divert the inlet stream from the leak opening and to give the liquid a clockwise swirling motion. Also provided were a pressure gauge and a bimetallic type thermometer. The fluid capacity of the entire system was about 0.9 liters. The leakage adaptor was 2⅜ inches in diameter with a ¾ inch high base and had a ½ inch deep threaded fitting for attachment to the reservoir. To the base was bolted a 2⅜ inch diameter plate of non-magnetic stainless steel in the 300 series which contained the required hole or leak. The plate consisted of two abutting ¼ inch thick sections with a notch cut into one section to provide the leak. The leak was a centered crevice and was 0.5 inches long and 0.018 inches wide. A crevice leak was used since it more effectively tests leak stopping abilities of the stop leak compositions than a "pin-hole" leak, which can be plugged with a single particle. A catch pot was provided to catch leaking liquid.

Before each test the test unit was cleaned by disassembly of the unit, mechanically removing any stop leak material and flushing the unit by pumping through it a rinse solution of water and detergent. The flushing is repeated until the unit is free of all stop leak material.

The tests were accomplished by adding 29 ml of the stop leak composition to water to give a liquid total 900 ml which was added into the test unit, which was then closed. The pump was started and the temperature or the fluid was raised to 190° F.±5° F. The fluid flow rate was set at about 11,000 grams/min. The unit was so operated with no pressure for 5 minutes after which the pressure was slowly built up to 15 psig over a period of 2½ minutes by incrementally increasing the pressure by 2½ psig every 30 seconds and then holding the pressure at 15 psig for 5½ minutes. The volume of the fluid lost after the leak was sealed and the nature of the leak were noted.

Compositions using a fibrillated fiber useful in the invention and soybean meal were made and compared with compositions of the fiber alone and the soybean meal alone. The fibrillated fiber and the soybean meal are the same as those described in Example 1. The fiber was dispersed in water with Bentonite GPG-30 clay, which was also used as a suspender. The clay was used in an amount of 5 weight percent based on the total weight of the composition. After the fiber was dispersed the seed meal was added and dispersed. The total of the fibrillated fiber and the seed meal in the stop leak composition was set at 1.50 weight percent, based on the total weight of the composition. A summary of the tests is shown in Table II.

TABLE II

| Wt. % Stop Leak Component | | Vol. Fluid Lost |
|---|---|---|
| Soybean Meal | Fibrillated Fiber | Nature of Leak |
| 1.50 | None | 75 ml, Dripping at end of test. |
| 1.23 | 0.27 | 54 ml, sealed |
| 0.75 | 0.75 | 47 ml, sealed |
| 0.27 | 1.23 | 10 ml, sealed |
| None | 1.50 | all fluid lost, no seal. |

The above results show the synergistic effect of using both the fibrillated fiber and the seed meal.

Comparative tests were run with compositions of soybean meal and asbestos fiber and each alone. These tests were run essentially as above except instead of the fibrillated fiber an asbestos fiber was used. The asbestos fiber was from Johns Manville Corp., Englewood Cliffs, N.J., and coded 7T05. A summary of these tests is in Table III.

TABLE III

| Wt. % Stop Leak Component | | Vol. Fluid Lost |
|---|---|---|
| Soybean Meal | Asbestos Fiber | Nature of Leak |
| 1.50 | None | Dripping at end of test. |
| 1.23 | 0.27 | 268 ml, slow drip |
| 0.75 | 0.75 | 93 ml, dripping at end of test |
| 0.27 | 1.23 | 282 ml, slow drip |
| None | 1.50 | all fluid lost, no seal. |

As shown by the above results, asbestos containing compositions of the prior art do not show the synergistic effect of the invention and are substantially inferior in leak stopping ability than the compositions of the invention. The asbestos fiber compositions of the prior art allowed a significantly larger amount of leakage, nearly an order of magnitude larger, than the compositions of the invention. In the test of the asbestos fiber containing compositions there was not a complete seal and if the test were sufficiently long a complete loss of fluid would have resulted. However, in the tests of the compositions made according to the invention, a complete seal was achieved and no further leakage would have occured. The results demonstrate the synergistic action of the particles and the fibrillated fiber used in the invention in inhibiting fluid loss and achieving a complete seal of the leak.

As an alternate embodiment, the above described compositions may contain a corrosion inhibitor in an inhibitory effective amount, such as those described above and those known in the art. Corrosion inhibitors are well known and are disclosed in several patents, such as, for example, U.S. Pat. No. 3,198,820, issued Aug. 3, 1965 to Pines and U.S. Pat. No. 3,337,496, issued Aug. 22, 1967 to Snyder et al., which patents are hereby incorporated by reference.

What is claimed is:

1. A composition for the stopping of liquid leaks in heat exchange systems which comprises a suspension in a liquid medium of:
    (a) particulate material in an amount and of a size sufficient to become entrained in the leak, and
    (b) fibrillated fiber coacting with the particulate material to seal the leak by an entwining action.

2. A composition for the stopping of liquid leaks in heat exchange systems which comprises a suspension in a liquid medium of:
(a) a particulate material in an amount and of a size sufficient to become entrained in the leak, and
(b) a fibrillated fiber coacting with the particulate material to seal the leak by an entwining action, the fibrillated fiber having a length of about 1 mm to about 7 mm and a surface area greater than about 1 square meter per gram.

3. The composition of claim 1 or 2 wherein the fibrillated fiber comprises a polymer consisting essentially of the recurring units selected from the group:

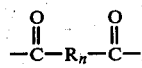 (I)

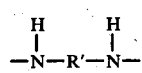 (II)

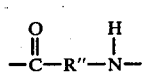 (III)

with the proviso that

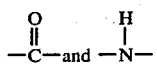

are present in the polymer in substantially equimolar amounts, and wherein R, R' and R", which may the same or different, are divalent radicals, n may be zero or the integer one, and wherein the R, R', and R" radicals in the polymer are saturated or unsaturated aliphatic or ring aliphatic radicals containing 1 to 10 carbon atoms or single or fused multringed carbocyclic or heterocyclic aromatic ringed radicals or a series of such radicals.

4. The composition of claim 3 wherein the R, R', and R" radicals in the polymer are single rigid radicals with extended bonds or a series of such rigid radicals which are linked together directly by extended bonds.

5. The composition of claim 3 wherein n is the integer one and wherein R, and R' are selected from the group 1,4-phenylene, 4,4'-biphenylene, 2,6-naphthylene, 2,5-pyridene, trans-vinylene and trans-1,4-cyclohexylene and R" is 1,4-phenylene with the proviso that at least 50 mole percent of either R or R' radicals are 1,4-phenylene.

6. The composition of claim 3 wherein the polymer consists essentially of the repeating unit

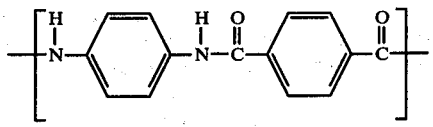

7. The composition of claim 1 or 2 wherein the particulate material is a seed meal.

8. The composition of claim 7 wherein the seed meal is soybean meal.

9. The composition of claim 1 or 2 having at least one corrosion inhibitor in an inhibitory effective amount.

10. A method for the plugging of liquid leaks in heat exchange systems which comprises forming a suspension in an amount and of a size sufficient to become entrained in the leak and a fibrillated fiber coating with the particulate material to seal the leak by an entwining action; and placing the liquid suspension in the leaky container.

11. A method for the plugging of leaks which comprises:
(a) forming a suspension in a liquid medium by dispersing in the liquid medium a particulate material in an about and of a size sufficient to become entrained in the leak, and a fibrillated fiber coacting with the particulate material to seal the leak by an entwining action, the fibrillated fiber having a length of about 1 mm to about 7 mm and a surface area greater than about 1 square meter per gram, and
(b) placing the suspension in a heat exchange system.

12. The method of claim 10 or 11 wherein the fibrillated fiber comprises a polymer consisting essentially of any of the recurring units selected from the group;

 (I)

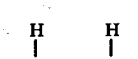 (II)

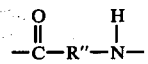 (III)

with the proviso that

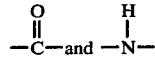

are present in the polymer in substantially equimolar amounts, R, R' and R", which may the same or different, are divalent radicals, n may be zero or the integer one, and wherein the R, R', and R" radicals in the polymer are saturated or unsaturated aliphatic or ringed aliphatic radicals containing 1 to 10 carbon atoms, or single or fused multiringed carboycyclic or heterocyclic aromatic radicals or a series of such radicals.

13. The method of claim 12 wherein the R, R, and R" radicals in the polymer are single rigid radicals with extended bonds or a series of such rigids radicals which are linked together directly by extended bonds.

14. The method of claim 12 wherein n is the integer one and wherein R, and R' are selected from the group 1,4-phenylene, 4,4'-biphenylene, 2,6-naphthylene, 2,5-pyridene, trans-vinylene and trans-1,4-cyclohexylene and R" is 1,4-phenylene with the proviso that at least 50 mole percent of either R or R' radicals are 1,4-phenylene.

15. The method of claim 12 wherein the polymer consists essentially of the repeating unit,

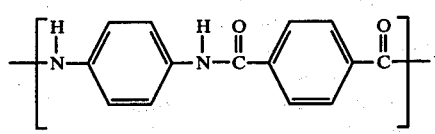

16. The method of claim 10 or 11 wherein the particulate material is a seed meal.

17. The method of claim 16 wherein the seed meal is soybean meal.

18. The method of claim 10 or 11 wherein the suspension has at least one corrosion inhibitor in an inhibitory effective amount.

19. A method for making a composition for the stopping of liquid leaks in heat exchange systems which comprises suspending in a liquid medium
(a) particulate material in an amount and of a size sufficient to become entrained in the leak, and
(b) fibrillated fiber in an amount which will coact with the particulate material to seal the leak by an entwining action.

20. A method for making a composition for the stopping of liquid leaks in heat exchange systems which comprises a suspension in a liquid medium of:
(a) a particulate material in an amount and of a size sufficient to become entrained in the leak, and
(b) a fibrillated fiber coacting with the particulate material to seal the leak by an entwining action, the fibrillated fiber having a length of about 1 mm to about 7 mm and a surface area greater than about 1 square meter per gram.

21. The method of claim 19 or 20 wherein the fibrillated fiber comprises a polymer consisting essentially of any of the recurring units selected from the group:

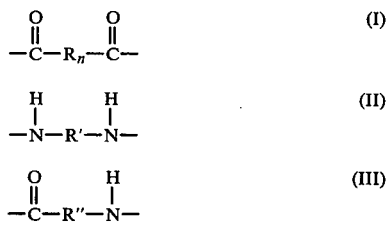

wherein

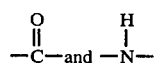

are present in the polymer in substantially equimolar amounts, R, R' and R", which may the same or different, are divalent radicals, n may be zero or the integer one, and wherein the R, R', and R" radicals in the polymer are saturated or unsaturated aliphatic or ringed aliphatic radicals containing 1 to 10 carbon atoms or single ringed or fused multiringed carboncyclic aromatic radicals, or a series of such aliphatic or aromatic radicals.

22. The method of claim 21 wherein the R, R', and R" radicals in the polymer are single rigid radicals with extended bonds or a series of such rigid radicals which are linked together directly by extended bonds.

23. The method of claim 21 wherein n is the integer one and wherein R, and R' are selected from the group 1,4-phenylene, 4,4'-biphenylene, 2,6-naphthylene, 2,5-pyridene, trans-vinylene and trans-1,4=cyclohexylene and R" is 1,4-phenylene with the proviso that at least 50 mole percent of either R or R' radicals are 1,4-phenylene.

24. The method of claim 21 wherein the polymer consists essentially of the repeating unit,

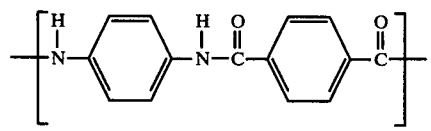

25. The method of claim 19 or 20 wherein the particulate material is a seed meal.

26. The method of claim 25 wherein the seed meal is soybean meal.

27. The composition of claim 1 having a weight ratio of fibrillated fiber to particulate material of about 1:20 to about 20:1.

28. The composition of claim 27 wherein the weight ratio of fibrillated fiber to particulate material is from about 1:5 to about 1:15.

29. The composition of claim 28 wherein the weight ratio of fibrillated fiber to particulate material is about 1:10.

30. The method of claim 19 or 20 wherein the liquid medium contains at least one corrosion inhibitor in an inhibitory effective amount.

31. The composition of claim 1 wherein the liquid medium comprises a monohydric or polyhydric alcohol.

32. The composition of claim 31 wherein the liquid medium comprises ethylene glycol.

33. The composition of claim 31 having at least one corrosion inhibitor in a inhibitory effective amount.

34. The composition of claim 1 wherein the liquid medium comprises water.

35. The method of claim 10 wherein the liquid medium comprises a monohydric or polyhydric alcohol.

36. The method of claim 35 wherein the liquid medium comprises ethylene glycol.

37. The method of claim 35 wherein the suspension contains at least one corrosion inhibitor in a inhibitory effective amount.

38. The method of claim 10 wherein the liquid medium comprises water.

39. The method of claim 19 wherein the liquid medium comprises a monohydric or polyhydric alcohol.

40. The method of claim 39 wherein the liquid medium comprises ethylene glycol.

41. The method of claim 39 wherein the suspension contains at least one corrosion inhibitor in a inhibitory effective amount.

42. The method of claim 19 wherein the liquid medium comprises water.

* * * * *

UNITED STATES PATENT AND TRADEMARK OFFICE
CERTIFICATE OF CORRECTION

PATENT NO. : 4,439,561
DATED : March 27, 1984
INVENTOR(S) : A. G. Barber

It is certified that error appears in the above-identified patent and that said Letters Patent is hereby corrected as shown below:

Col. 4, line 17, "contaning" should read -- containing --;
Col. 4, line 18, "carbocylic" should read -- carbocyclic --;
Col. 4, line 19, "heterocylic" should read -- heterocyclic --;
Col. 8, line 18, "ASE-60" should read -- ASE-6 --;
Col. 12, line 42, "carboycyclic" should read -- carbocyclic --; and
Col. 13, line 48, "carboncyclic" should read -- carbocyclic --.

Signed and Sealed this

Sixteenth Day of October 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,439,561
DATED : March 27, 1984
INVENTOR(S) : A. G. Barber

It is certified that error appears in the above-identified patent and that said Letters Patent is hereby corrected as shown below:

Col. 8, line 62, "a 16 quart ounce can of stop leak composition to" should be deleted.

Signed and Sealed this

Second Day of April 1985

[SEAL]

Attest:

DONALD J. QUIGG

*Attesting Officer*   *Acting Commissioner of Patents and Trademarks*